United States Patent
Pendleton

(10) Patent No.: US 7,234,556 B2
(45) Date of Patent: Jun. 26, 2007

(54) ONE-TOUCH CRUISE CONTROL SYSTEM

(76) Inventor: Clifford J. Pendleton, 11 Woodman Park, Owls Head, ME (US) 04854

( * ) Notice: Subject to any disclaimer, the term of this patent is extended or adjusted under 35 U.S.C. 154(b) by 260 days.

(21) Appl. No.: 10/840,102

(22) Filed: May 6, 2004

(65) Prior Publication Data

US 2005/0247497 A1    Nov. 10, 2005

(51) Int. Cl.
*B60K 31/04* (2006.01)
(52) U.S. Cl. .................. 180/170; 180/171; 180/172; 180/173; 180/174; 180/175; 180/176; 180/177
(58) Field of Classification Search ........ 180/170–179; 701/93
See application file for complete search history.

(56) References Cited

U.S. PATENT DOCUMENTS

| | | | | |
|---|---|---|---|---|
| 3,406,775 A | * | 10/1968 | Magnuski | 180/177 |
| 4,180,713 A | * | 12/1979 | Gonzales | 200/52 R |
| 4,590,370 A | * | 5/1986 | Mills et al. | 250/267 |
| 4,701,629 A | * | 10/1987 | Citroen | 307/10.1 |
| 4,933,859 A | * | 6/1990 | Tsuyama et al. | 701/93 |
| 5,393,277 A | * | 2/1995 | White et al. | 477/108 |
| 5,684,374 A | * | 11/1997 | Chaffee | 318/616 |
| 5,775,451 A | * | 7/1998 | Hull et al. | 180/170 |
| 6,240,773 B1 | * | 6/2001 | Rita et al. | 73/118.1 |
| 6,431,930 B1 | * | 8/2002 | Holt | 440/84 |

* cited by examiner

*Primary Examiner*—Christopher P. Ellis
*Assistant Examiner*—Cynthia F. Collado
(74) *Attorney, Agent, or Firm*—Galasso & Associates, LP; Raymond M. Galasso

(57) ABSTRACT

A vehicle cruise control system comprises a plurality of pre-set cruise control speed buttons and cruise control logic circuitry coupled to the pre-set cruise control speed buttons. Each one of the pre-set cruise control speed buttons corresponds to a respective pre-set cruise control speed. The cruise control logic circuitry is configured for implementing control of a vehicle speed to maintain the respective pre-set cruise control speed corresponding to a selected one of said pre-set cruise control speed buttons.

14 Claims, 3 Drawing Sheets

ONE-TOUCH CRUISE CONTROL SYSTEM

FIELD OF THE DISCLOSURE

The disclosures made herein relate generally to cruise control systems and, more particularly, to cruise control systems that reduce required input from the driver for achieving a desired cruise control speed.

BACKGROUND

Cruise control equipment is, of course, connected to a vehicle's operation control components (e.g., accelerator components, brake system components, steering system, transmission control components, etc). With conventional cruise control systems, a vehicle is first taken to a desired speed. Then, the cruise control system is turned on via a first driver-performed operation and then the cruise control system is set at a current speed via a second driver-performed operation. In many, if not most, cruise control systems, the input controls for performing various cruise control operations (e.g., turning the cruise control system on and setting the present speed) are located at different locations of the dashboard, steering wheel and/or control levers. For example, one input control is located on the steering wheel and another input control is located on or adjacent to the dashboard.

Such conventional cruise control systems are known to have limitations that adversely affect their effectiveness, safety, and/or practicality. One limitation is that various required input controls are located at disparate locations, which requires a driver to move their attention from concentrating on driving the car to the tasks of locating and operating input controls required for facilitating cruise control operation. Another limitation is that multiple operations must be performed to set a desired cruise control speed, further distracting a driver's attention from focusing on driving the car. Still another limitation is the need for the driver to manually achieve a desired cruise control speed in order to set that desired cruise control speed.

Therefore, a cruise control system that overcomes limitations associated with such conventional cruise control systems would be useful and novel.

SUMMARY OF THE DISCLOSURE

In one embodiment of an embodiment of the inventive disclosures made herein, a vehicle cruise control system comprises a plurality of pre-set cruise control speed buttons and cruise control logic circuitry coupled to the pre-set cruise control speed buttons. Each one of the pre-set cruise control speed buttons corresponds to a respective pre-set cruise control speed. The cruise control logic circuitry is configured for implementing control of a vehicle speed to maintain the respective pre-set cruise control speed corresponding to a selected one of the pre-set cruise control speed buttons.

In another embodiment, a cruise control input-output apparatus comprises a plurality of pre-set cruise control speed buttons, a current speed set button, and cruise control logic circuitry coupled to the buttons. The plurality of pre-set cruise control speed buttons each correspond to a respective pre-set cruise control speed. The current speed set button is configured for implementing control of the vehicle speed to maintain a vehicle speed exhibited at the time when the current speed set button is depressed. The cruise control logic circuitry is configured for implementing control of a vehicle speed to maintain a cruise control speed corresponding to a selected one of the buttons. Implementing control of the vehicle speed includes determining the cruise control speed corresponding to a selected one of the buttons and outputting a control signal corresponding to the cruise control speed corresponding to a selected one of the buttons. The control signal simulates a signal interpretable by logic of an original equipment manufacturer cruise control system.

In still another embodiment, a method for facilitating vehicle cruise control operation comprises receiving a speed control request signal corresponding to a selected one of a plurality of pre-set cruise control speed buttons each corresponding to a respective pre-set cruise control speed and implementing control of a vehicle speed to maintain the respective pre-set cruise control speed corresponding to the selected one of the pre-set cruise control speed buttons in response to receiving the speed control signal.

Accordingly, it is a principal object of the inventive disclosures made herein to provide a novel and useful approach for effecting cruise control operation via a one-touch button interface. Specifically, systems, methods and cruise control input-output apparatuses in accordance with the inventive disclosures made herein are configured to allow cruise control operation to be effected through one touch of a button rather than a sequence of inputs (e.g., button selections). Operations such as activating a cruise control system and setting a desired the cruise control speed are accomplished with the touch of one button.

It is another object of the inventive disclosures made herein to provide for placement of the operational components (e.g., pre-set cruise control speed buttons) in a convenient and centralized location, making them easier and safer to access.

It is another object of the inventive disclosures made herein for allowing the cruise control operations (e.g., activating the cruise control system and setting a desired cruise control speed) to be preset and then activated in the proper sequence as the motorist pushes one button.

It is another object of the inventive disclosures made herein for each one of the pre-set cruise control speeds to correspond to a respective legal roadway speed.

It is another object of the inventive disclosures made herein for implementing control of the vehicle speed to include determining the respective pre-set cruise control speed and outputting a control signal corresponding to the respective preset cruise control speed.

It is another object of the inventive disclosures made herein for implementing control of the vehicle speed to include activating components of an original equipment cruise control system and setting the components of the original equipment cruise control system to maintain the respective pre-set cruise control speed corresponding to the selected one of the pre-set cruise control speed buttons.

It is another object of the inventive disclosures made herein to provide a current speed set button for implementing control of the vehicle speed to maintain a vehicle speed exhibited at the time when the current speed set button is depressed.

It is another object of the inventive disclosures made herein for cruise control logic circuitry to be segmented between a first cruise control circuitry module comprising a plurality of pre-set cruise control speed buttons and a second cruise control circuitry module comprising original equipment manufacturer cruise control circuitry of a vehicle.

It is another object of the inventive disclosures made herein for determining the respective pre-set cruise control speed to be performed by the first cruise control circuitry module and for outputting the control signal to include outputting the control signal from the first cruise control circuitry module for reception by the second cruise control circuitry module.

It is another object of the inventive disclosures made herein for the control signal to be configured for activating the second cruise control circuitry module.

It is another object of the inventive disclosures made herein for the control signal to simulate a signal interpretable by logic of the second cruise control circuitry module.

These and other objects of the inventive disclosures made herein will become readily apparent upon further review of the following specification and associated drawings.

DETAILED DESCRIPTION OF THE DRAWINGS

Figure 1:
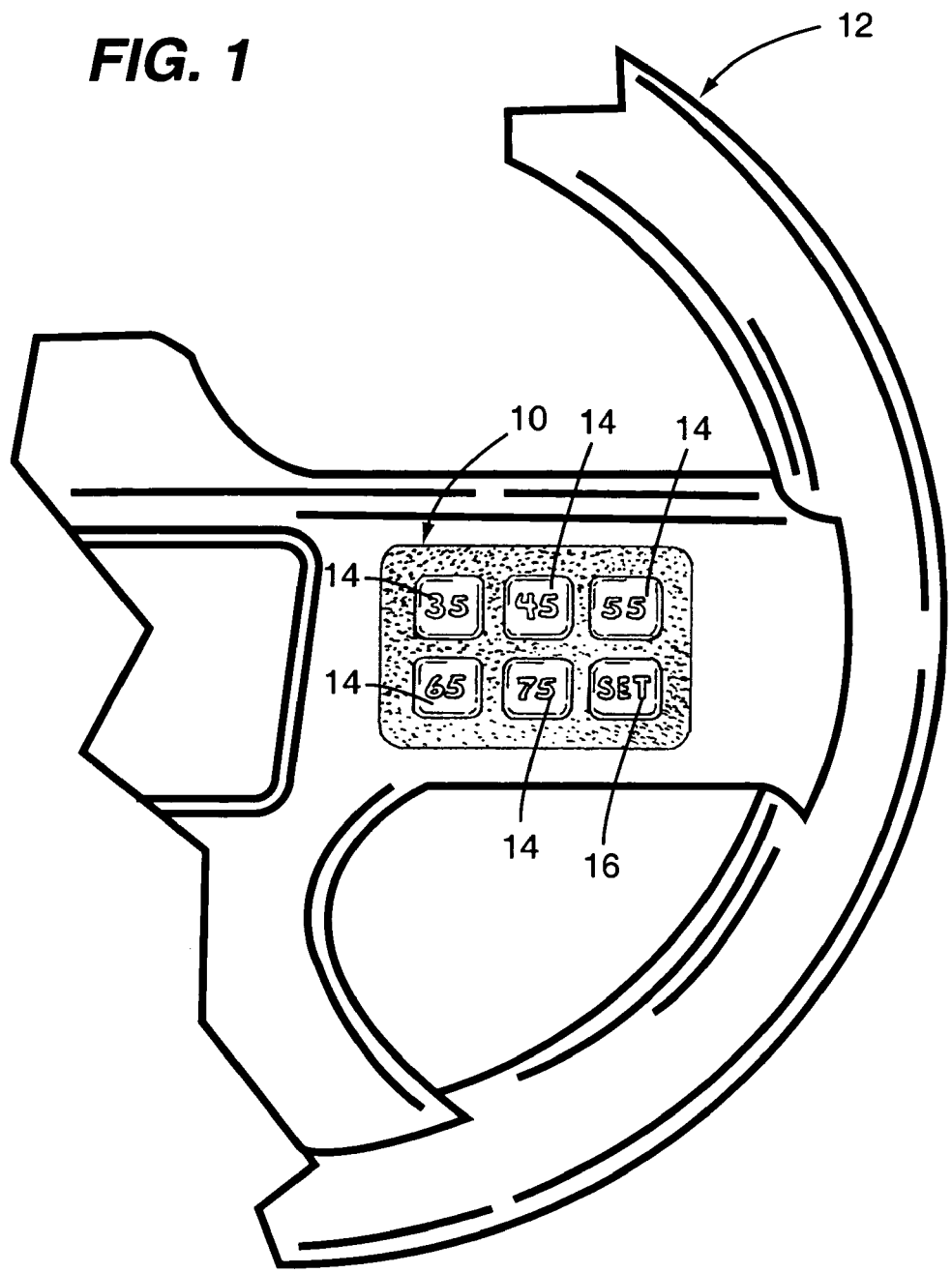
FIG. 1 depicts a speed control interface in accordance with an embodiment of the inventive disclosures made herein.

FIG. 1 depicts a speed control interface 10 in accordance with an embodiment of the inventive disclosures made herein. The speed control interface 10 is mounted on a steering wheel 12 of a vehicle. The speed control interface 10 includes a plurality of pre-set cruise control speed buttons 14 and a current speed set button 16. It is contemplated and disclosed herein that such buttons may be lighted, textured or otherwise configured for enhancing their identification and operation. Each one of the pre-set cruise control speed buttons 14 corresponds to a respective pre-set cruise control speed. At least a portion of the pre-set cruise control speed buttons 14 may correspond to common speed limits within a given country, its providences, its cities and/or its states.

The plurality of pre-set cruise control speed buttons 14 is comprised by buttons corresponding to respective pre-set cruise control speeds. Specifically, the plurality of pre-set speed buttons 14 serve as inputs for implementing control of a vehicle speed via a cruise control system to maintain and/or achieve at a respective speed level. The set current speed set button 16 is comprised by a button that serves as an input for implementing control of a vehicle via the cruise control system to maintain and/or achieve a vehicle speed exhibited at the time when the current speed set button is depressed, which may be a different speed than provided by the pre-set speed buttons. Activation of the brake or clutch of the vehicle deactivates the cruise control operation, returning the vehicle's speed control to displacement of the accelerator pedal by the driver.

Figure 2:
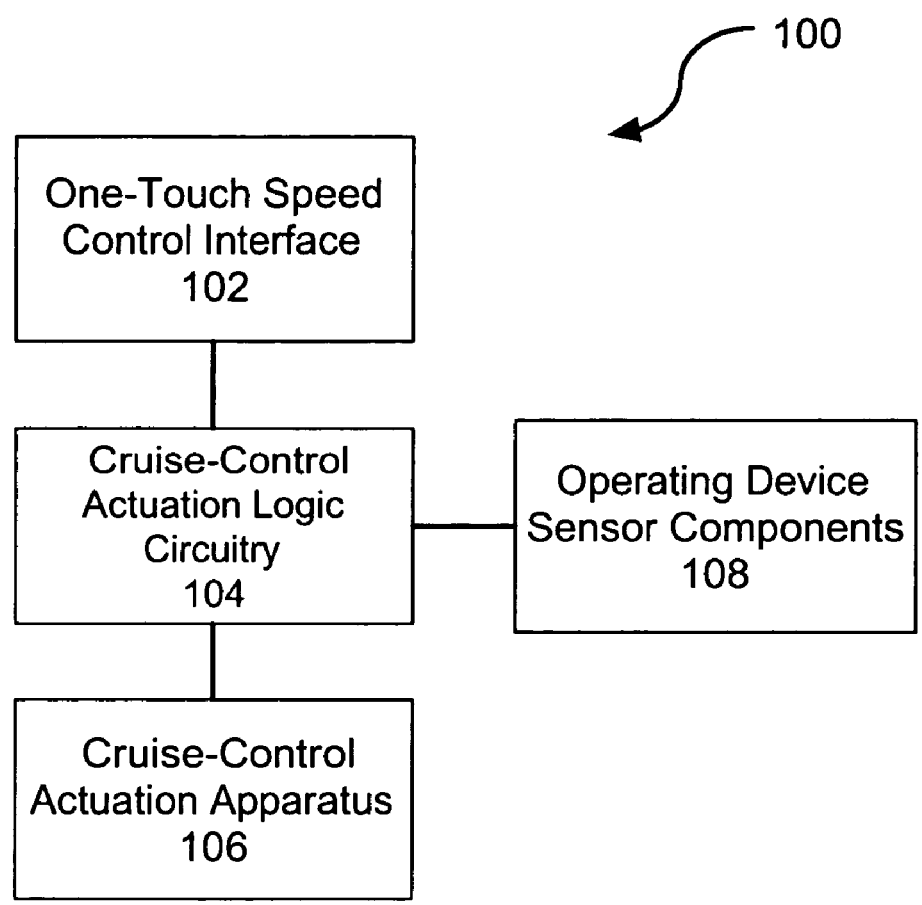
FIG. 2 depicts a cruise control system in accordance with an embodiment of the inventive disclosures made herein.

FIG. 2 depicts a cruise control system 100 in accordance with an embodiment of the inventive disclosures made herein. The cruise control system 100 includes a one-touch speed control interface 102, cruise control logic 104, cruise-control actuation apparatus 106 and vehicle operating components 108. The one-touch speed control interface 102, the cruise-control actuation components 106 and the vehicle operating device sensing components 108 are connected to the cruise control logic circuitry for enabling interaction therebetween.

The speed control interface module 10 depicted in FIG. 1 is an embodiment of the one-touch speed control interface 100. Accordingly, the one-touch speed control interface 102 includes a plurality of pre-set cruise control speed buttons and, optionally, a current speed set button. Each one of the pre-set cruise control speed buttons corresponds to a respective pre-set cruise control speed. A vacuum actuator and an electromechanical servo connected to a throttle linkage of a carburetor or throttle body of a vehicle are examples of the cruise control actuation apparatus 106. A limit switch configured for sensing depression of a brake pedal assembly of the vehicle and a limit switch configured for sensing depression of a clutch pedal assembly of the vehicle are examples of the operating device sensing components 108.

The cruise control logic circuitry 104 is configured for implementing control of a vehicle speed to maintain a cruise control speed corresponding to a selected one of the buttons of the one-touch speed control module 102. The cruise control logic circuitry 104 interprets an input signal generated in response to a selected one of the buttons of the one-touch speed control interface 100 being depressed. The cruise control logic circuitry interacts with the cruise control actuation apparatus 106 for controlling operating devices of the vehicle (e.g., throttle linkage of a carburetor or throttle body) to achieve and/or maintain a vehicle speed corresponding to the selected one of the one-touch speed control interface 102. Broadly speaking, implementing control of the vehicle speed includes activating components, apparatuses and/or circuitry of the original equipment cruise control system and setting such components, apparatuses and/or circuitry to maintain a respective control speed corresponding to a selected one of the buttons of the speed control interface 102.

The cruise control logic circuitry 104 receives feedback signals from the operating device sensing components 108 upon the driver operating the corresponding vehicle operating device (e.g., brake pedal and/or clutch pedal) and correspondingly turns off the cruise control system, returning full control of the vehicle to the driver. It should be understood that a cruise control system in accordance with embodiments of the inventive disclosures made herein, like conventional cruise control systems, takes command of vehicle accelerator function for achieving and/or maintaining a particular speed during cruise control operation. A driver of the vehicle can exert pressure on the accelerator pedal for accomplishing a speed greater than that targeted by the active cruise control system.

In one embodiment, the cruise control logic circuitry 104 is segmented between a first cruise control circuitry module comprising the pre-set cruise control speed buttons with associated logic and a second cruise control circuitry module comprising an original equipment manufacturer cruise control circuitry of a vehicle. The combination of a one-touch speed control interface in accordance with the inventive disclosures made herein and logic circuitry for outputting a control signal interpretable and actionable by the original equipment manufacturer cruise control circuitry of the second cruise control circuitry module is an embodiment of the first cruise control circuitry module. In such an embodiment, the first cruise control circuitry module is configured for determining the respective pre-set cruise control speed associated with a selected one of the speed control buttons, for outputting a control signal for reception by the second cruise control circuitry module and for activating the second cruise control circuitry module. Correspondingly, the second cruise control circuitry module interprets the control signal and outputs a corresponding actuation signal for reception by the cruise control actuation apparatus 106. The control signal simulates a signal interpretable by logic of the second cruise control circuitry module, which enables retrofitting of the first cruise control module to an existing cruise control system with, at most, minimal alteration to the logic of the second cruise control circuitry module.

Figure 3:
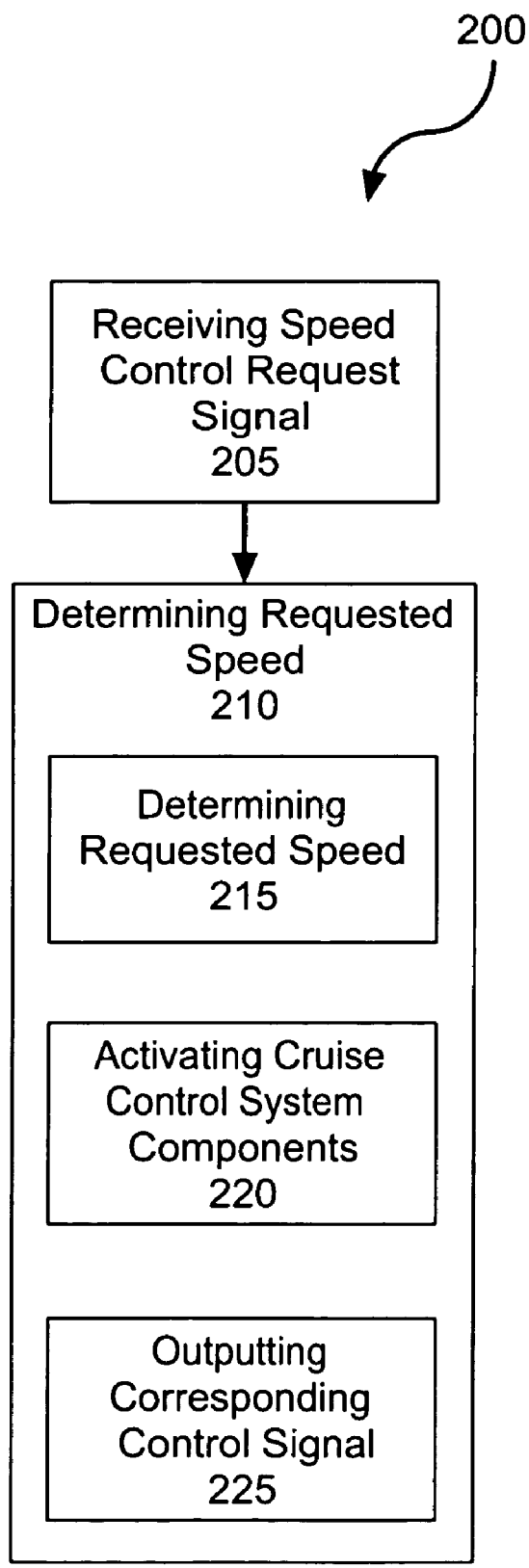
FIG. 3 depicts a method for facilitating vehicle cruise control operation in accordance with an embodiment of the inventive disclosures made herein, which may be carried out by a cruise control system in accordance with the inventive embodiments of the disclosures made herein (e.g., the cruise control system depicted in FIG. 2).

FIG. 3 depicts a method 200 for facilitating vehicle cruise control operation in accordance with an embodiment of the inventive disclosures made herein, which may be carried out by a cruise control system in accordance with the inventive embodiments of the disclosures made herein (e.g., the cruise control system 100). An operation 205 is performed for receiving a speed control request signal corresponding to a selected one of a plurality of pre-set cruise control speed buttons that each correspond to a respective pre-set cruise control speed. In response to receiving the speed control request signal, an operation 205 is performed for implementing control of a vehicle speed to maintain the respective pre-set cruise control speed corresponding to the selected one of the pre-set cruise control speed buttons.

In one embodiment, implementing control of the vehicle speed includes a step 215 determining the respective pre-set cruise control speed, a step 220 for activating cruise control system components and a step 225 for outputting a control signal corresponding to the respective preset cruise control speed. Such determination may be performed by a first cruise control circuitry module of a cruise control system (e.g., the cruise control system 100) comprising the pre-set cruise control speed buttons and such outputting may include outputting the control signal from the first cruise control circuitry module for reception by a second cruise control circuitry module comprising original equipment manufacturer cruise control circuitry of a vehicle. Steps comprising the operation of implementing control of the vehicle speed may be performed sequentially and/or in parallel, as required for carrying out the necessary functionality.

In another embodiment, implementing control of the vehicle speed includes activating components of an original equipment cruise control system and setting the components of the original equipment cruise control system to maintain the respective pre-set cruise control speed corresponding to the selected one of the pre-set cruise control speed buttons. Such setting includes outputting a control signal corresponding to the respective preset cruise control speed. Furthermore, the control signal is configured for activating the second cruise control circuitry module and, where needed, the control signal simulates a signal interpretable by logic of an original equipment manufacturer cruise control system of a vehicle.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle cruise control system, comprising:
   a plurality of one touch pre-set cruise control speed buttons each button corresponding to a respective legal roadway speed wherein the speed is selected by depressing one button;
   a first cruise control logic circuitry module coupled to said pre-set cruise control speed buttons and configured for implementing control of a vehicle speed to maintain the respective pre-set cruise control speed corresponding to a selected one of said pre-set cruise control speed buttons; and
   a second cruise control circuitry module comprising original equipment manufacturer cruise control circuitry of a vehicle.

2. The vehicle cruise control system of claim 1 wherein each one of said pre-set cruise control speeds corresponds to a respective legal roadway speed.

3. The vehicle cruise control system of claim 1 wherein implementing control of the vehicle speed includes:
   determining the respective pre-set cruise control speed; and
   outputting a control signal corresponding to the respective preset cruise control speed.

4. The vehicle cruise control system of claim 1 wherein implementing control of the vehicle speed includes:
   setting said components of the original equipment cruise control system to maintain the respective pre-set cruise control speed corresponding to the selected one of said pre-set cruise control speed buttons.

5. The vehicle cruise control system of claim 1, further comprising:
   a current speed set button for implementing control of the vehicle speed to maintain a vehicle speed exhibited at the time when the current speed set button is depressed.

6. The vehicle cruise control system of claim 4 wherein:
   implementing control of the vehicle speed includes determining the respective pre-set cruise control speed and outputting a control signal corresponding to the respective preset cruise control speed;
   determining the respective pre-set cruise control speed is performed by the first cruise control circuitry module; and
   outputting the control signal includes outputting the control signal from the first cruise control circuitry module for reception by the second cruise control circuitry module.

7. The vehicle cruise control system of claim 6 wherein the control signal is configured for activating the second cruise control circuitry module.

8. The vehicle cruise control system of claim 6 wherein the control signal simulates a signal interpretable by logic of the second cruise control circuitry module.

9. The vehicle cruise control system of claim 1 wherein:
   implementing control of the vehicle speed includes determining the respective pre-set cruise control speed and outputting a control signal corresponding to the respective preset cruise control speed;
   determining the respective pre-set cruise control speed is performed by the first cruise control circuitry module; and outputting the control signal includes outputting the control signal from the first cruise control circuitry module for reception by the second cruise control circuitry module;

the control signal is configured for activating the second cruise control circuitry module; and the control signal simulates a signal interpretable by logic of the second cruise control circuitry module.

10. The vehicle cruise control system of claim 1 wherein:

implementing control of the vehicle speed includes activating components of the original equipment cruise control system and setting said components of the original equipment cruise control system to maintain the respective pre-set cruise control speed corresponding to the selected one of said pre-set cruise control speed buttons;

setting said components of the original equipment cruise control system includes outputting a control signal corresponding to the respective preset cruise control speed;

the control signal is configured for activating the second cruise control circuitry module; and the control signal simulates a signal interpretable by logic of the second cruise control circuitry module.

11. A method for facilitating vehicle cruise control operation, comprising:

receiving a speed control request signal corresponding to a selected one of a plurality of pre-set one touch cruise control speed buttons each corresponding to a respective pre-set cruise control speed, wherein cruise control speed is selected by depressing only one button, wherein each button corresponds to preset speed rather than to a digit of a desired speed as in a numeric keypad; and implementing control of a vehicle speed to maintain the respective pre-set cruise control speed corresponding to the selected one of said pre-set cruise control speed buttons in response to receiving the speed control signal;

implementing control of the vehicle speed includes determining the respective pre-set cruise control speed and outputting a control signal corresponding to the respective preset cruise control speed;

determining the respective pre-set cruise control speed is performed by a first cruise control circuitry module comprising said pre-set cruise control speed buttons;

outputting the control signal includes outputting the control signal from the first cruise control circuitry module for reception by a second cruise control circuitry module comprising original equipment manufacturer cruise control circuitry of a vehicle;

the control signal is configured for activating the second cruise control circuitry module; and the control signal simulates a signal interpretable by logic of the second cruise control circuitry module.

12. The method of claim 11 wherein implementing control of the vehicle speed includes:

determining the respective pre-set cruise control speed; and outputting a control signal corresponding to the respective preset cruise control speed.

13. The method of claim 11 wherein implementing control of the vehicle speed includes:

setting said components of the original equipment cruise control system to maintain the respective pre-set cruise control speed corresponding to the selected one of said pre-set cruise control speed button.

14. The method of claim 11 wherein:

implementing control of the vehicle speed includes activating components of the original equipment cruise control system and setting said components of the original equipment cruise control system to maintain the respective pre-set cruise control speed corresponding to the selected one of said pre-set cruise control speed buttons;

setting said components of the original equipment cruise control system includes outputting a control signal corresponding to the respective preset cruise control speed;

the control signal simulates a signal interpretable by logic of the original equipment cruise control system.

* * * * *